United States Patent [19]

Christensen

[11] Patent Number: 5,566,748
[45] Date of Patent: Oct. 22, 1996

[54] CHARGE AIR COOLER/CONDENSER SUB-ASSEMBLY FOR USE IN A MOTOR VEHICLE

[75] Inventor: Steven S. Christensen, Fremont, Calif.

[73] Assignee: AlliedSignal Inc., Morris Township, N.J.

[21] Appl. No.: 554,959

[22] Filed: Nov. 13, 1995

[51] Int. Cl.⁶ .................................... F28F 9/00
[52] U.S. Cl. .................... 165/67; 165/41; 165/81; 165/140; 165/149; 165/DIG. 51; 180/68.4
[58] Field of Search ............... 165/67, 41, 140, 165/81, 149; 180/68.4

[56] References Cited

U.S. PATENT DOCUMENTS

| | | | |
|---|---|---|---|
| 1,447,695 | 3/1923 | Storms | 180/68.4 |
| 1,593,245 | 7/1926 | Cutler | 165/149 |
| 4,330,030 | 5/1982 | Cate | 165/67 |
| 4,531,574 | 7/1985 | Hoch | 165/67 |
| 4,678,026 | 7/1987 | Lenz et al. | 165/67 |
| 4,997,033 | 3/1991 | Ghiani et al. | 165/67 |
| 5,095,882 | 3/1992 | Christensen . | |
| 5,097,891 | 3/1992 | Christensen . | |
| 5,139,080 | 8/1992 | Bolton et al. | 165/67 |
| 5,219,016 | 6/1993 | Bolton et al. | 165/41 |
| 5,219,019 | 6/1993 | LeGauyer | 165/67 |
| 5,267,624 | 12/1993 | Christensen . | |
| 5,269,367 | 12/1993 | Susa et al. | 165/41 |
| 5,271,473 | 12/1993 | Ikeda et al. | 180/68.4 |

FOREIGN PATENT DOCUMENTS

| | | | |
|---|---|---|---|
| 178266 | 4/1986 | European Pat. Off. | 180/68.4 |
| 498880 | 1/1920 | France | 180/68.4 |
| 641329 | 12/1926 | France | 180/68.4 |
| 59-202937 | 11/1984 | Japan | 180/68.4 |
| 151187 | 9/1920 | United Kingdom | 180/68.4 |
| 2173459 | 10/1986 | United Kingdom | 180/68.4 |

*Primary Examiner*—Allen J. Flanigan
*Attorney, Agent, or Firm*—John R. Rafter

[57] ABSTRACT

A cooling system sub-assembly for use in a motor vehicle comprising a charge air cooler mounted to a support structure attached to a chassis of the motor vehicle and a condenser mounted to the charge air cooler so as to accommodate at least differential thermal growth between the condenser and the charge air cooler and so as to dispose the condenser in series flow relationship with the charge air cooler. A first lateral end of the condenser is fixed relative to the charge air cooler, while a pair of generally horizontally extending pins are connected to the other lateral end of the condenser and slidingly engage compressible grommet assemblies disposed within holes formed in each of a pair of vertically spaced mount brackets attached to the charge air cooler. Alternatively, a pair of vertically spaced mount flanges may be cast as an integral unit with one of the end manifolds of the charge air cooler, with each of the flanges receiving one of the condenser pins.

7 Claims, 14 Drawing Sheets

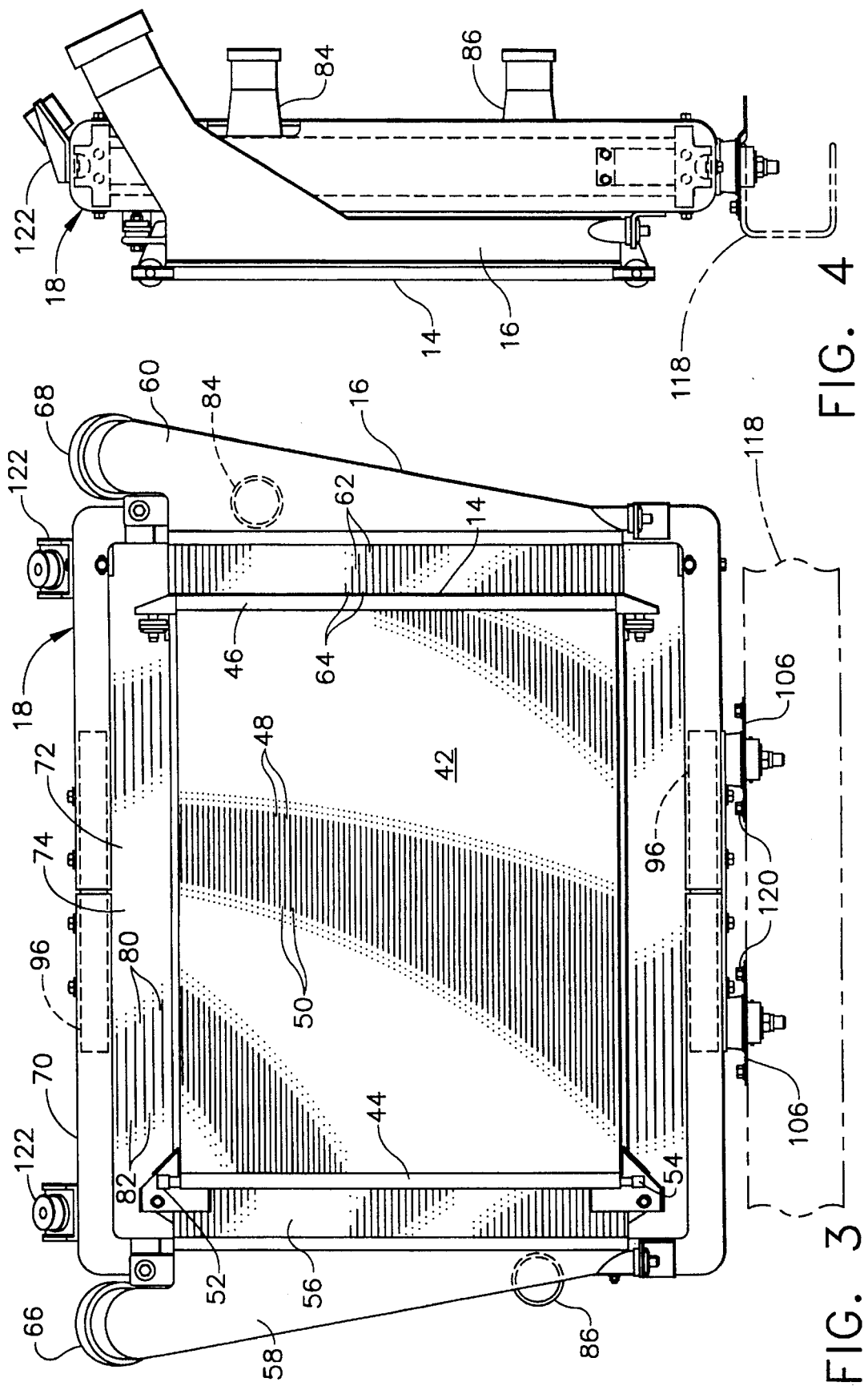

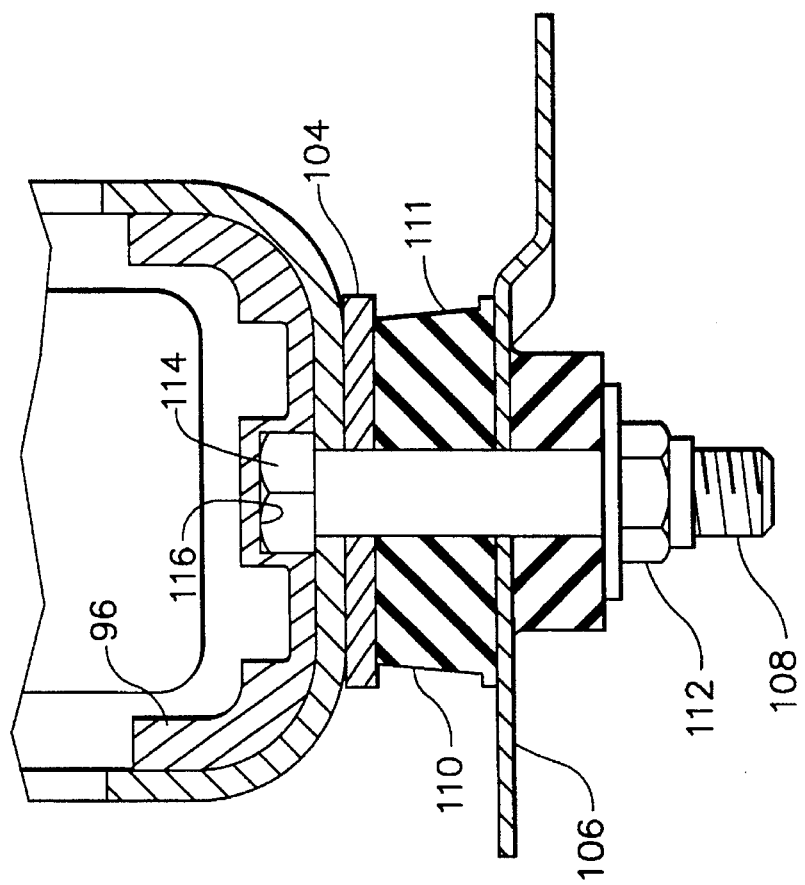
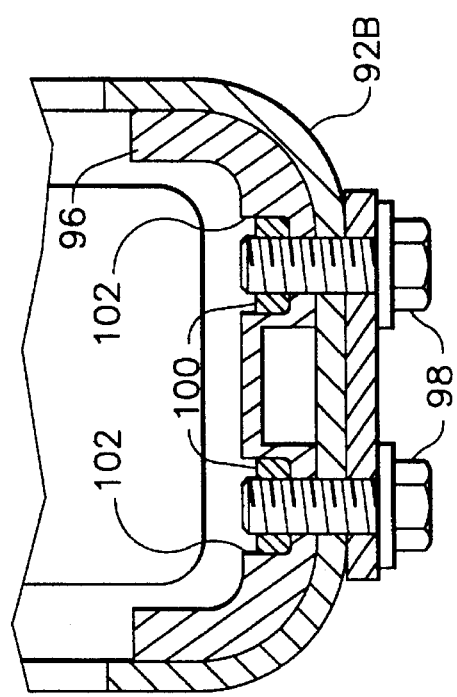

CHARGE AIR COOLER/CONDENSER SUB-ASSEMBLY FOR USE IN A MOTOR VEHICLE

CROSS REFERENCES

The subject application is related to concurrently filed and commonly assigned U.S. Patent Applications having attorney docket numbers 2900-94-004 and 2900-94-005 entitled, respectively, "Radiator, Charge Air Cooler and Condenser Mounting Method" and "Radiator Assembly For Use In A Motor Vehicle".

BACKGROUND OF THE INVENTION

1.0 Field of the Invention

The present invention relates to motor vehicle cooling systems and, more particularly, to a charge air cooler/condenser sub-assembly for use in heavy vehicles such as trucks.

2.0 Related Art

Motor vehicles, including heavy vehicles such as trucks, utilize a radiator assembly to eliminate waste heat from the internal combustion engine of the vehicle. The waste heat is a by-product of the internal combustion process and must be removed to allow steady state operation of the vehicle powertrain system. The radiator assembly includes a frame mounted to the chassis of the motor vehicle and a radiator mounted to the frame and comprising a core, or heat exchanger, and inlet and outlet manifolds or header ranks which communicate with the core. The radiator core comprises a plurality of tubes and fins, typically disposed in alternating laterally extending rows, with the tubes communicating with the inlet and outlet tanks so as to provide a flowpath for an engine coolant fluid, particularly water or glycol. Ambient cooling air is forced across the tubes and fins during operation of the vehicle resulting in heat transfer from the heated engine coolant flowing inside the core tubes to the ambient air stream. The temperature of the coolant fluid is typically controlled by a thermostat but can still vary by 20°–40° F. during normal operation of the vehicle due to engine load, ambient conditions, altitude and vehicle speed. The mean temperature of the radiator is therefore not constant, while the temperature of the frame remains relatively constant, corresponding approximately to ambient temperature. Known radiator cores are typically rigidly mounted to the radiator frame, thereby failing to accommodate the differential expansion of the core and frame. For instance, in one known apparatus, the radiator frame includes upper and lower members, with each fixedly attached at opposite ends to the radiator inlet and outlet tanks, thereby causing the tanks to be structural load-carrying members. In some instances, this arrangement, coupled with the differential thermal expansion of the radiator core tubes and the frame, has resulted in tube distress, in the form of cracks, at a location proximate one of the tanks.

The engines of heavy vehicles such as trucks may be turbocharged and accordingly such vehicles may include a charge air cooler (CAC) for purposes of cooling the turbocharged engine intake air before the air enters the engine for the combustion process. The intake air is heated during the turbocharger compression process and must be cooled by the CAC to satisfy engine durability and performance requirements. The CAC typically includes inlet and outlet manifolds and a core assembly having a plurality of alternating tubes and fins, with ambient air forced across the tubes so as to cool the heated intake air flowing through the tubes during operation of the vehicle. The temperature of the tubocharged intake air varies widely as a function of engine load, ambient conditions, altitude and vehicle speed. Consequently, as with the radiator, the mean temperature of the CAC is not constant.

Heavy vehicles also typically include a refrigerant condenser assembly which receives high pressure, superheated refrigerant gas from the refrigerant compressor and condenses the gas into a high pressure liquid for expansion and cooling of the vehicle cab. The superheated vapor is first cooled to its saturation point at the existing operating pressure and is then condensed isothermally into the high pressure liquid. The high pressure liquid is then sub-cooled to a temperature below the condensing temperature. The temperatures within the condenser vary widely due to vehicle thermal load, engine speed, vehicle speed and ambient conditions.

Heat exchangers such as the radiator, CAC and condenser are surface area dependent, requiring substantial surface area to produce the required temperature reduction of the fluids being cooled. The radiator, CAC and condenser may be mounted in a parallel flow relationship, so as to maximize the airflow through each unit, as shown in FIG. 1 of U.S. Pat. No. 5,095,882, with respect to a radiator assembly and a CAC, or aftercooler. However, such a parallel flow arrangement is unnecessarily cumbersome, particularly in small engine compartments. Accordingly, in certain applications it is desirable to arrange the various heat exchangers in a stacked, or series flow arrangement. While this arrangement alleviates the spatial problem associated with the parallel flow mounting scheme, known systems of this type fail to accommodate the differential thermal expansion which may occur between each adjacent pair, of heat exchangers, due to the varying temperature profiles of the radiator, CAC, and condenser. For instance, the inventor is not aware of any known systems which accommodates differential thermal expansion between a condenser and a CAC mounted in series. Failure to accommodate this differential thermal expansion can result in relatively large thermal stresses, which in turn can cause premature component failures.

SUMMARY

Accordingly, the present invention is directed to a cooling system sub-assembly for use in a motor vehicle. According to a preferred embodiment of the present invention the cooling system sub-assembly comprises a charge air cooler mounted to a support structure attached to a chassis of a motor vehicle and a condenser mounted to the charge air cooler so as to accommodate differential thermal growth between the condenser and charge air cooler and so as to dispose the condenser in series flow relationship with the charge air cooler. The condenser includes a core and first and second lateral end portions attached to opposite lateral ends of the core. A pair of vertically spaced and generally horizontally extending pins are connected to the first lateral end portion of the condenser and a pair of vertically spaced pin-receiving mount means are attached to the charge air cooler. Each of the mount means includes a hole formed therein which is aligned with the one of the pins. The sub-assembly further includes a pair of compressible grommet assemblies, with one of the grommet assemblies disposed within the hole formed in each of the mount means. Each of the pins are inserted through one of the grommet assemblies.

According to other preferred embodiments, the present invention may include the following structural features and functions. A first pair of vertically spaced mount brackets is attached to the condenser and laterally spaced from the pins. A second pair of vertically spaced mount brackets is attached to the charge air cooler, with each of the second pair of mount brackets being aligned with and fastened to one of the first pair of mount brackets.

The charge air cooler includes a core and a pair of end manifolds attached to opposite lateral ends of the core and the pair of vertically spaced pin-receiving mount means may comprise a third pair of vertically spaced mount brackets, with one of the third pair of mount brackets attached to an upper surface of the core of the charge air cooler and the other of the third pair of mount brackets attached to a lower surface of the core of the charge air cooler. In this embodiment, the sub-assembly further comprises a fourth pair of vertically spaced mount brackets, with one being attached to a lower end of the first lateral end portion of the condenser and the other being attached to an upper end of the first lateral end portion of the condenser. In this embodiment each of the generally horizontally extending pins is attached to one of the fourth pair of mount brackets.

Alternatively, the pair of pin-receiving mount means may comprise first and second vertically spaced mount flanges, with each of the mount flanges and one of the end manifolds of the charge air cooler being cast as an integral unit. In this embodiment, the pair of vertically spaced and generally horizontally extending pins are directly attached to the first lateral end portion of the condenser.

Each of the grommet assemblies comprises a nylon sleeve having a generally cylindrical portion disposed about one of the generally horizontally extending pins and an elastomeric grommet coaxially disposed about the cylindrical portion of the nylon sleeve.

A main advantage of the sub-assembly of the present invention is the accommodation of at least differential thermal growth between the condenser and the charge air cooler.

BRIEF DESCRIPTION OF THE DRAWINGS

The aforementioned advantage, as well as the method steps and other advantages of the present invention, will become more apparent from subsequent description of the preferred embodiments when taken in conjunction with the accompanying drawings, wherein:

FIG. 3 is a front elevational view illustrating the condenser, charge air cooler and radiator assembly of the cooling system of the present invention;

FIG. 4 is a side elevational view illustrating the condenser, charge air cooler and radiator assembly shown in FIG. 3;

FIG. 7 is a view taken along line 7—7 in FIG. 6;

FIG. 8 is a view taken along line 8—8 in FIG. 6;

DETAILED DESCRIPTION

Figure 1:
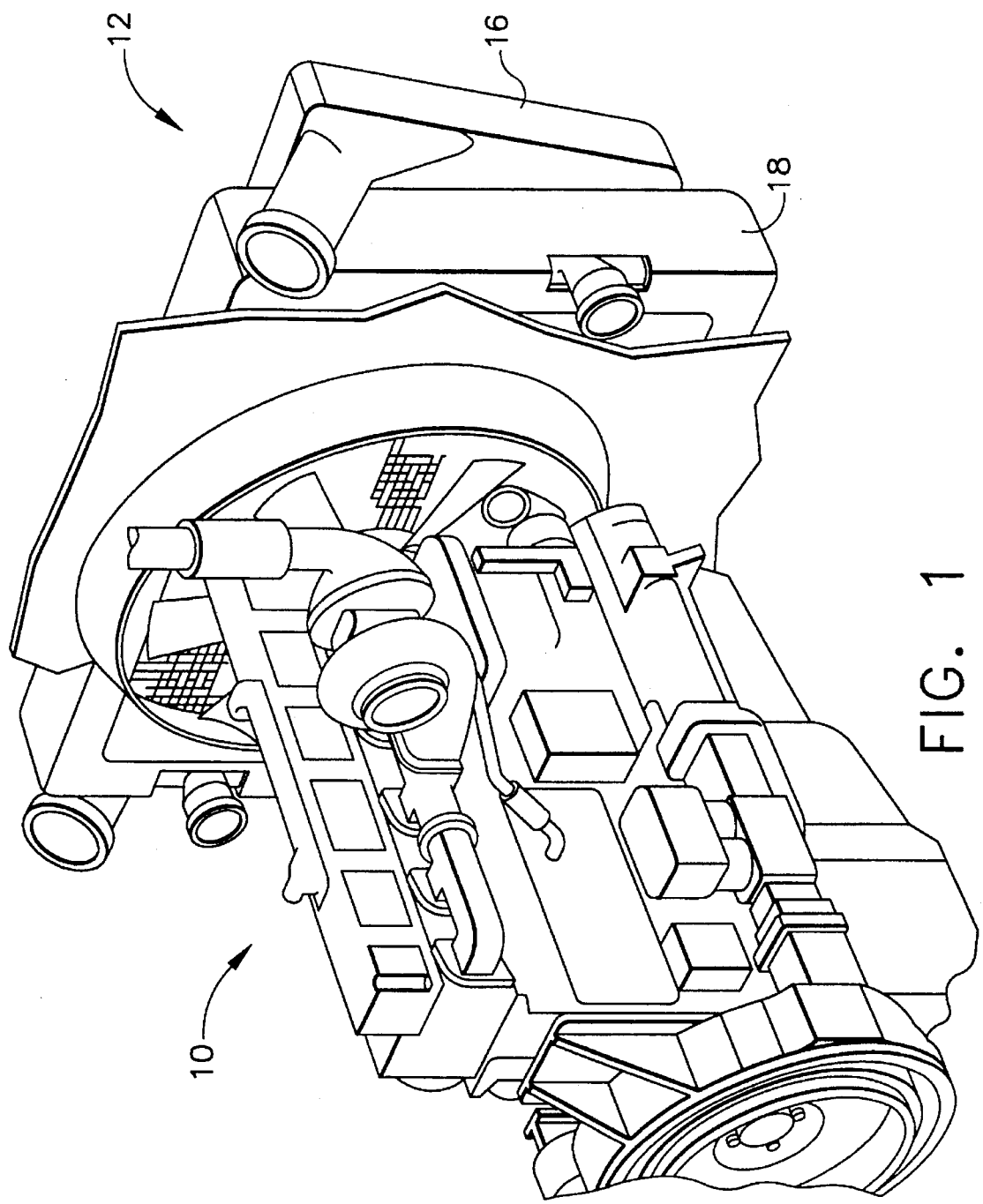
FIG. 1 is a perspective view of an internal combustion engine of a motor vehicle incorporating the cooling system of the present invention.
Figure 2:
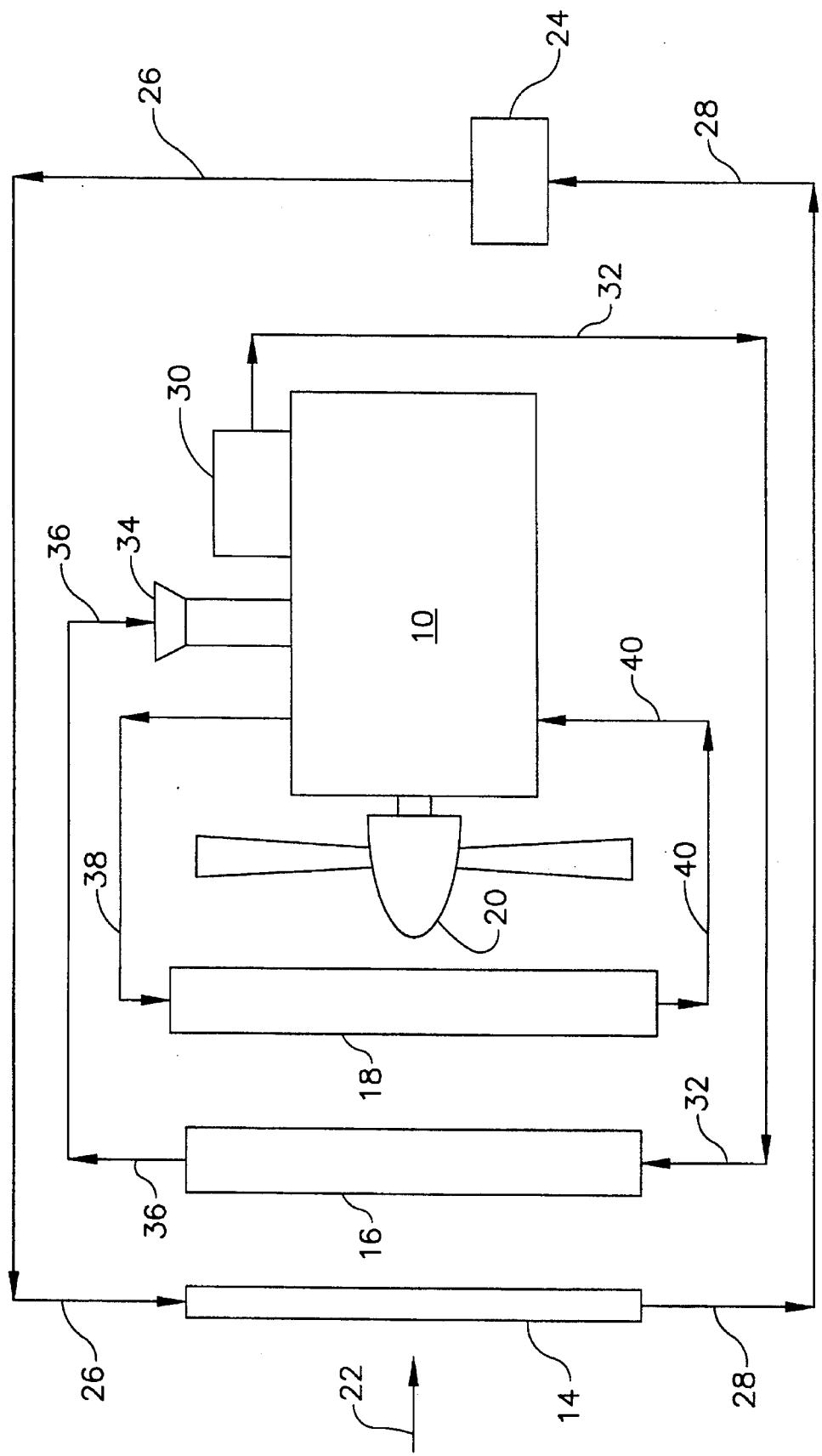
FIG. 2 is a schematic flow diagram of the cooling system shown in FIG. 1.

Referring now to the drawings, FIG. 1 is a perspective view illustrating an internal combustion engine 10 of a motor vehicle incorporating a cooling system, indicated generally at 12, according to the present invention. Cooling system 12 includes a condenser 14 (not shown in FIG. 1), a charge air cooler 16 and a radiator assembly 18 which are illustrated schematically in the flow diagram of FIG. 2. As shown in FIGS. 1 and 2, the condenser 14, charge air cooler 16 and radiator assembly 18 are disposed in series flow relationship with one another and are mounted forward of a fan 20 of engine 10. During the operation of engine 10, the suction action of fan 20 forces ambient air 22 to be drawn through, in succession, condenser 14, charge air cooler 16 and radiator assembly 18. Additionally, the flow of ambient air 22 is assisted by the forward motion of the associated motor vehicle. During operation of engine 10, condenser 14 receives a high pressure, superheated refrigerant gas from a refrigerant compressor, indicated generally at 24, of an air conditioning system used to cool the passenger compartment of the associated motor vehicle, via conventional conduits as indicated by flow arrows 26. The superheated vapor flowing through condenser 14 is first cooled to its saturation point by ambient air 22 at the existing operating pressure of the vapor and is then condensed isothermally by the ambient air 22 into a high pressure liquid which returns to compressor 24 via conventional conduits as indicated by flow arrows 28. According to a preferred embodiment, engine 10 is used with a heavy vehicle such as a truck and includes a turbocharger, indicated generally at 30, for purposes of turbocharging the intake air of engine 10. The intake air is heated during the turbocharger compression process and must be cooled to satisfy engine durability and performance requirements. This is accomplished by routing the air discharging from the turbocharger 30 to the charge air cooler 16 via conventional conduits as indicated by flow arrows 32, where the heated intake air is cooled by ambient air 22 flowing through charge air cooler 16. The intake air is then routed from the charge air cooler 16 to an intake manifold, indicated generally at 34, of engine 10 via conventional conduits as indicated by flow arrows 36. Engine 10 produces waste heat as a byproduct of the internal combustion process, which must be removed to allow steady state operation of engine 10. The elimination of this waste heat is accomplished by radiator assembly 18, with coolant fluid, typically water or glycol, routed from engine 10 to radiator assembly 18 via conventional conduits as depicted by flow arrow 38, where the coolant fluid is cooled by ambient air 22 as it flows through the radiator assembly 18. The coolant fluid then discharges from radiator assembly 18 and is returned, via conventional conduits to engine 10 as depicted by flow arrows 40.

Figure 5:
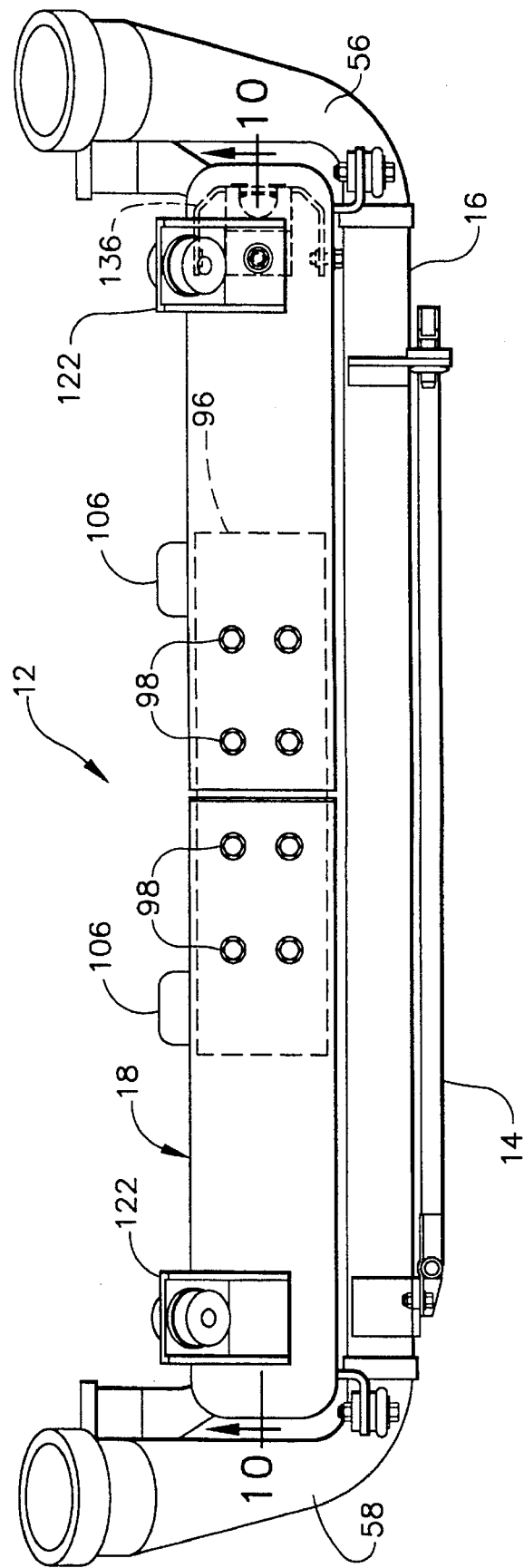
FIG. 5 is a plan view illustrating the condenser, charge air cooler and radiator shown in FIGS. 3 and 4.
Figure 6:
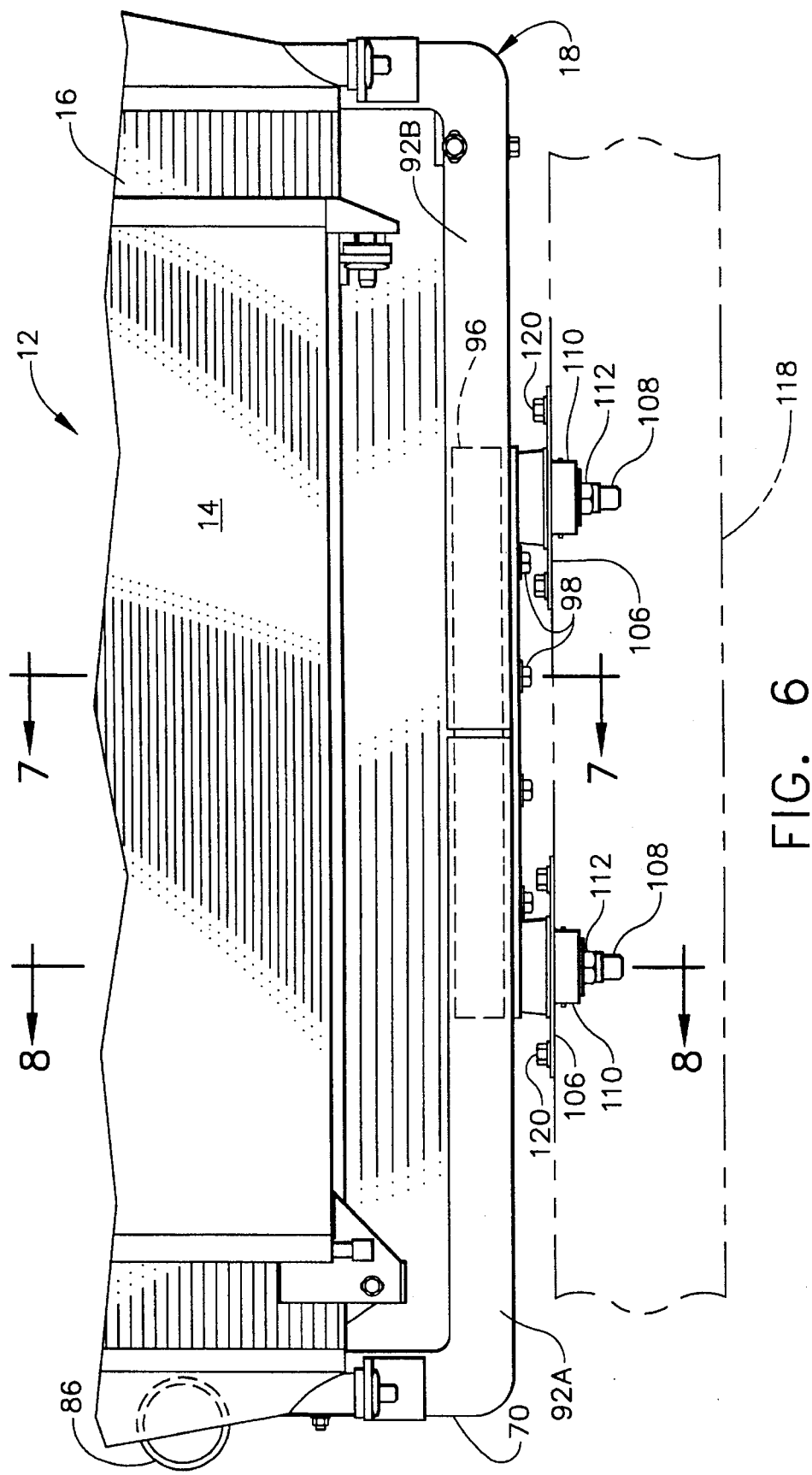
FIG. 6 is a fragmentary front elevational view illustrating the mounting of the radiator assembly to the chassis of the motor vehicle.

The condenser 14, charge air cooler 16 and the radiator assembly 18 are illustrated in detail in FIGS. 3–5 which correspond to front and side elevation views and a plan view, respectively. As shown in FIG. 3–5, condenser 14 includes a central core, or heat exchanger 42 and generally vertically end manifolds 44 and 46 attached to opposite lateral ends of the core 42. Core 42 includes a plurality of laterally extending tubes 48, which are substantially parallel to one another, with each of the tubes 48 being in fluid flow communication with both of the end manifolds 44 and 46. The core 42 of condenser 14 further includes a plurality of fins 50 having a serpentine, or corrugated shape (not shown for ease of illustration), which extend laterally across core 42. Tubes 48 and fins 50 are interdigitated with one another. End manifold 44 includes an upper inlet fitting 52 which is effective for receiving the superheated refrigerant gas from the refrigerant compressor 24, with the gas flowing through tubes 48 between manifolds 44 and 46. Condenser 14 may comprise a conventional 2-pass condenser, or alternatively, may comprise other conventional types such as a 4-pass condenser, with the number of passes determined by appropriate dividers (not shown) within end manifolds 44 and 46. The superheated refrigerant gas is first cooled to its saturation point at the existing operating pressure and is then condensed isothermally into the high pressure liquid which exits through an outlet fitting 54 attached to a lower end of the end manifold 44, and then returns to the refrigerant compressor 24. The temperature within the condenser vary widely due to the speed of engine 10, the speed and thermal load of the associated motor vehicle, and ambient conditions. In a preferred embodiment, the various components of condenser 14 are constructed of aluminum, but suitable alternative metals may also be utilized. The charge air cooler 16 includes a central core, or heat exchanger 56, an inlet end manifold 58 attached to core 56, and an outlet end manifold 60 which is also attached to core 56. Core 56 includes a plurality of laterally extending tubes 62, which are substantially parallel to one another, and which are in fluid flow communication with the end manifolds 58 and 60. Core 56 further includes a plurality of laterally extending fins 64, each having a serpentine or corrugated shape (not shown for ease of illustration), which are interdigitated, or disposed in vertically alternating relationship with tubes 62. Inlet manifold 58 includes a inlet port 66 which is effective for receiving the heated intake air from turbocharger 30 during operation of engine 10. The heated intake air then flows through tubes 62, where it is cooled by the ambient air 22, to the outlet manifold 60. The intake air then discharges through an outlet port 68 of manifold 60 and then flows to the intake manifold 34 of engine 10. The temperature of the turbocharged intake air entering inlet manifold 58 varies widely as function of the thermal load of engine 10, ambient conditions, altitude and the speed of the associated motor vehicle. Consequently, the mean temperature of charge air cooler 16 is not constant. The radiator assembly 18 includes a frame 70 and a radiator 72 disposed within and mounted to frame 70. The radiator 72 includes a central core, or heat exchanger 74, and first and second lateral end portions, or end manifolds 76 and 78 (best seen in FIG. 10), respectively, which are attached to the radiator core 74. Core 74 includes a plurality of laterally extending tubes 80, which are substantially parallel to one another, and which are in fluid flow communication with the end manifolds 76 and 78 of radiator 72. Radiator 72 further includes a plurality of laterally extending fins 82 having a serpentine, or corrugated shape (not shown for ease of illustration) which are interdigitated with tubes 80. The radiator 72 further includes an inlet tube 84 which communicates with the end manifold 78 of radiator 72 and is effective 2 for receiving coolant fluid, such as water or glycol, from engine 10. Radiator 72 also includes an outlet tube 86 which communicates with the outlet end manifold 76. The engine coolant fluid flows through inlet tube 84 into end manifold 78 and then through tubes 80, where it is cooled by ambient air 22, and then to outlet manifold 76. The engine coolant fluid then discharges through the outlet tube 86 and is returned to engine 10. Although the temperature of the engine coolant fluid is typically controlled by a thermostat, the coolant fluid temperature may still vary by about 20°–40° F. during normal operation of the motor vehicle due to the thermal load of engine 10, ambient conditions, altitude and the speed of the motor vehicle. Due to the widely varying temperature profiles of the condenser 14, charge air cooler 16 and the radiator 72 of radiator assembly 18, it is necessary to accommodate differential thermal expansion the condenser 14 relative to the charge air cooler 16, thermal expansion of condenser 16 relative to the radiator assembly 18, and thermal expansion of radiator 72 relative to radiator frame 70, so as to avoid hardware distress caused by large thermal stresses. This is accomplished by the novel mounting method of the present invention, as discussed subsequently detail.

Figure 9:
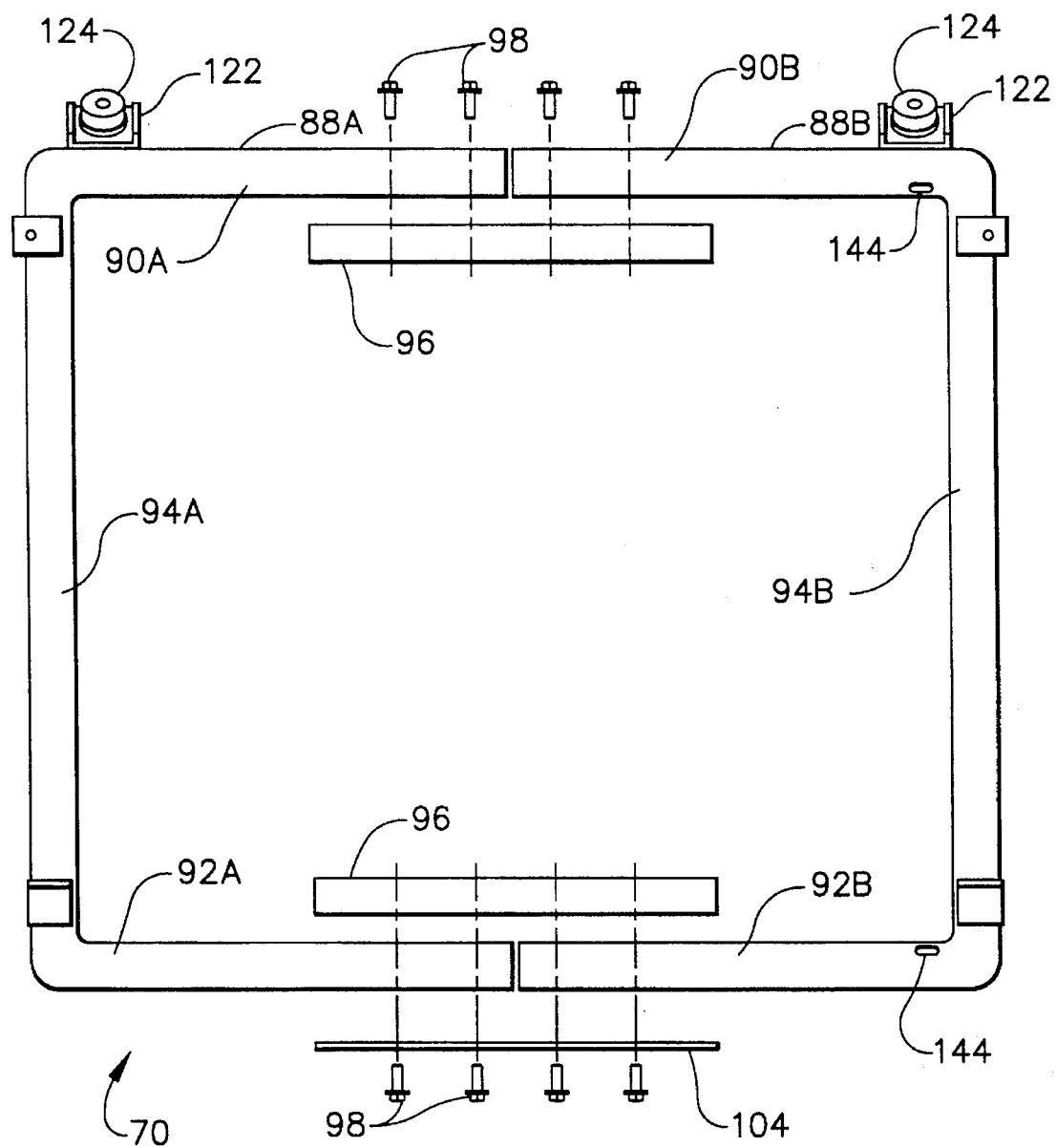
FIG. 9 is a front elevational view illustrating the support frame of the radiator assembly of the present invention.

Referring now to FIGS. 6–9, additional structural features of radiator assembly 18, as well as the method for mounting radiator assembly 18 to the motor vehicle, are illustrated and discussed in greater detail. As shown in FIG. 9, the frame 70 of radiator assembly 18 includes first and second generally U-shaped portions 88A and 88B, respectively, which are substantially mirror images of one another. Portions 88A and 88B, have a generally U-shaped cross section as shown in FIGS. 7 and 8. Portion 88A includes an upper, generally horizontally extending member 90A, a lower, generally horizontally extending member 92A, and a generally vertically extending member 94A interconnecting and attached to members 90A and 92A. Similarly, the U-shaped portion 88B includes upper and lower generally horizontally members 90B and 92B, respectively, and a generally vertically extending member 94B interconnecting and attached to members 90B and 92B. Portions 88A and 88B are connected to one another by a pair of generally U-shaped connecting members 96 of frame 70. An upper one of the connecting members 96 is attached to members 90A and 90B of portions 88A and 88B, respectively, by conventional fasteners such as bolts 98. Similarly, the lower one of the connecting members 96 is attached members 92A and 92B of portions 88A and 88B, respectively, by bolts 98. As shown in FIG. 7, with respect to member 92B and the lower one of the members 96, each of the bolts 98 is threaded into a threaded insert 100 captured within an anti-rotation slot 102 formed in one of the connecting members 96. The frame 70 further includes a doubler plate 104 which is fastened to members 92A and 92B and the lower one of connecting members 96 by bolts 98. Radiator assembly 18 further includes a pair of chassis mount plates 106, with each of the plates 106 being secured to frame 70 by a mount bolt 108, an elastomeric isolator 110 and a nut 112. Each isolator 110 has a first portion 111 disposed between frame 70 and one of the plates 106. Each of the bolts 108 includes a head portion 114 which is captured within an anti-rotation slot 116 formed in the lower one of the connecting members 96. Each of the bolts 108 passes through a hole formed in the corresponding one of isolators 110, extends below plate 106 and is secured with one of the nuts 112. Each of the mount plates 106 is fastened to a cross-member 118 of the motor vehicle chassis by conventional fasteners such as bolts 120, so as to mount frame 70 to chassis cross-member 118. Radiator assembly 18 further includes a pair of laterally spaced tie-rod brackets 122 which are attached by conventional means, such as welding, to frame 70. A first one of the brackets 122 is welded to member 90A of the U-shaped portion 88A of frame 70, and the second mount bracket 122 is welded to the member 90B of the U-shaped portion 88B of frame 70. An elastomeric isolator 124 is disposed within a hole formed in each of the brackets 122. A pair of tie rods (not shown) are secured at an upper end thereof to the brackets 122 and to the motor vehicle chassis, for purposes of mounting frame 70 to the motor vehicle chassis. The use of the lower elastomeric isolators 110 and the upper elastomeric isolators 124, isolates frame 70 from mechanical vibration loads during the operation of the motor vehicle.

Figure 10:
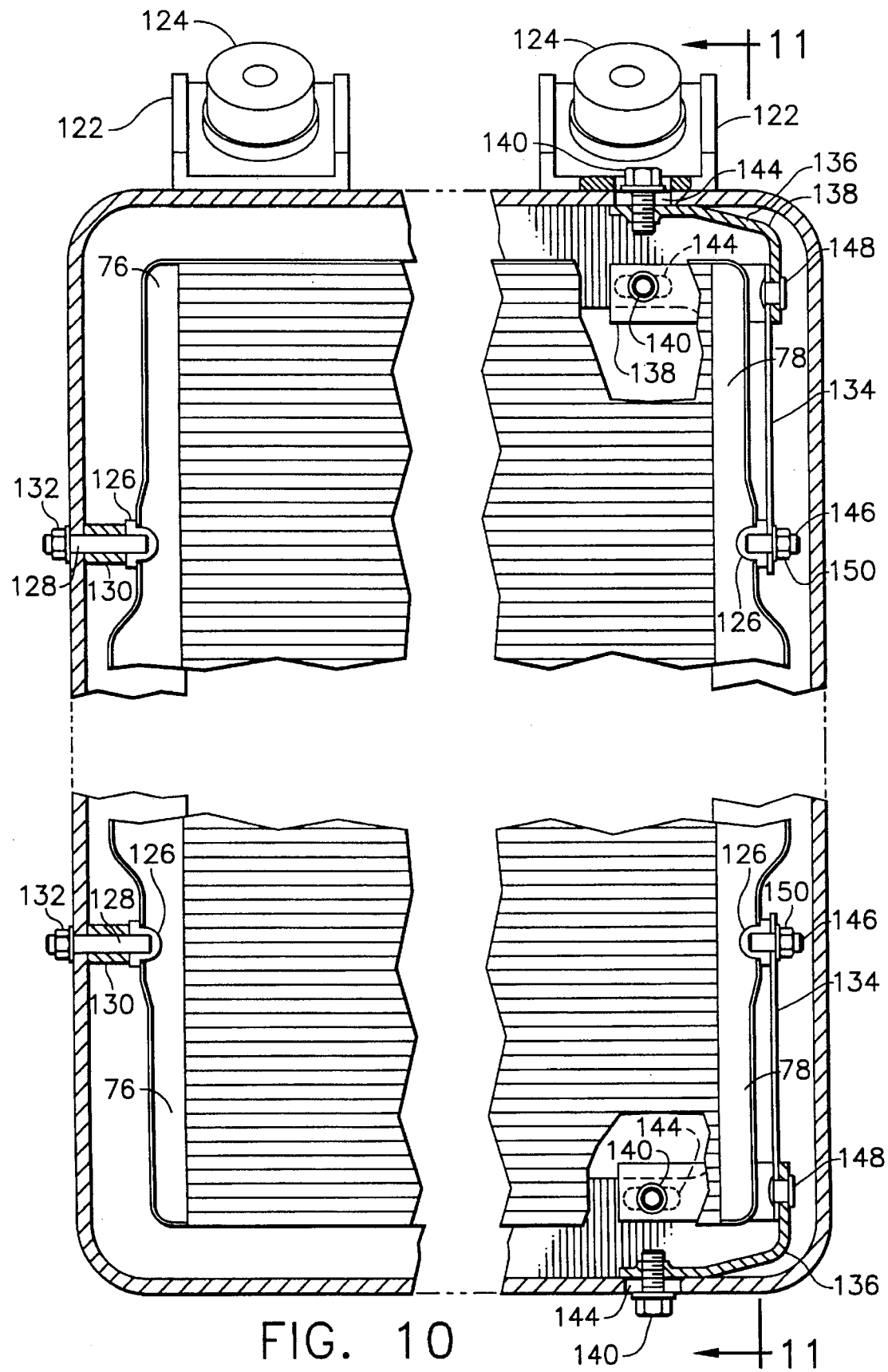
FIG. 10 is a view taken along line 10—10 in FIG. 5.
Figures 11, 12:
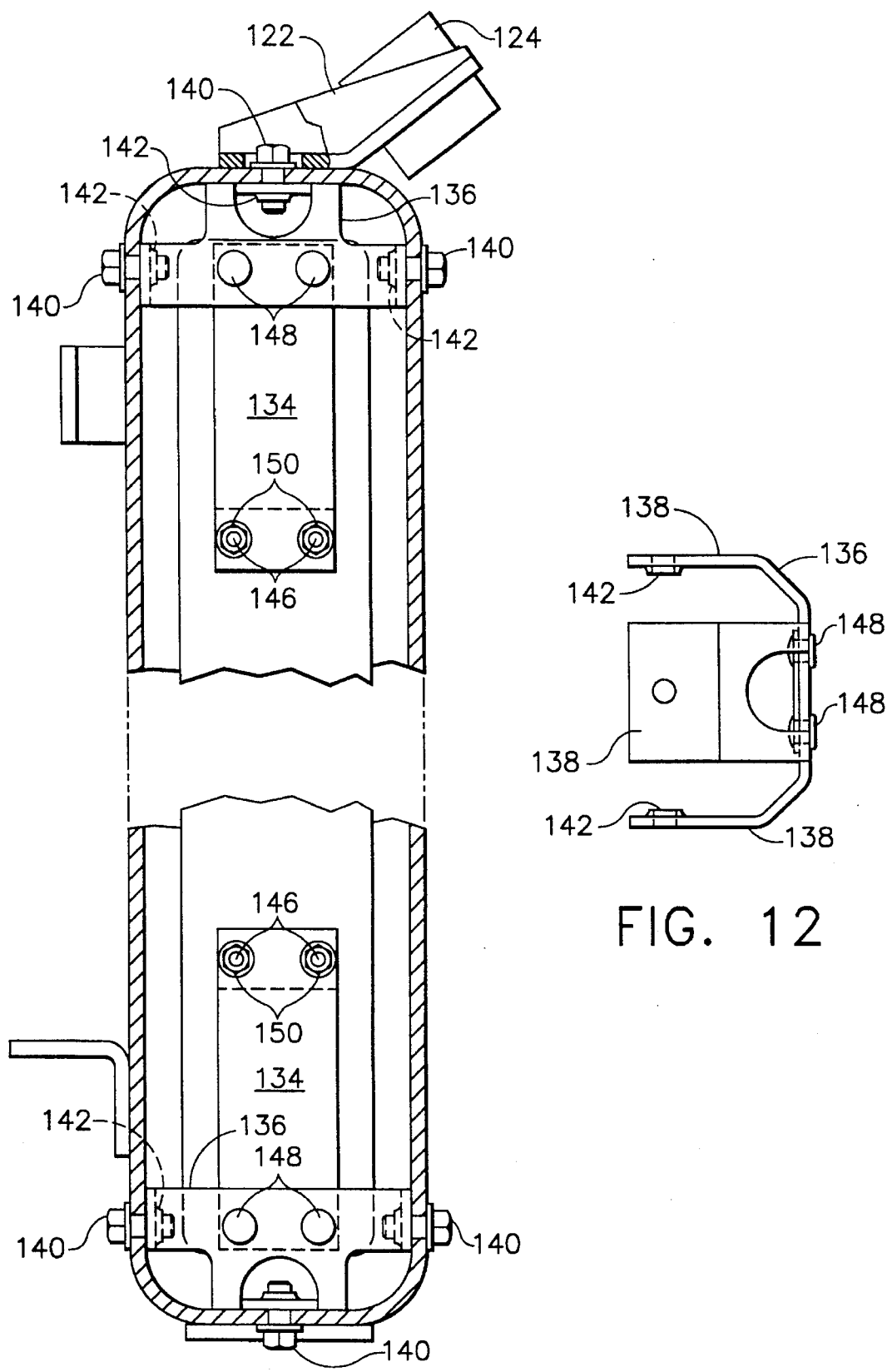
FIG. 11 is a view taken along line 11—11 in FIG. 10.
FIG. 12 is a view further illustrating the radiator assembly, leaf spring mounting bracket shown in FIGS. 10 and 11.

FIGS. 10–12 illustrate the apparatus and method steps regarding the mounting of the radiator 72 to the frame, or support structure 70 of radiator assembly 18. A first lateral end portion of radiator 70, comprising end manifold 76, is rigidly mounted to frame 70, whereas a second lateral end portion of radiator 70, comprising the end manifold 78, is resiliently mounted to frame 70 so as to accommodate lateral thermal growth of radiator 72 relative to the frame, or support structure 70. Radiator assembly 18 includes a first pair of vertically spaced nuts 126 which are brazed within indentations formed in the end manifold 76 and a pair of threaded studs 128 having a first end brazed within one of the nuts 126 and a second threaded end. Each of the studs passes through a hole formed in a metallic spacer 130 and a hole formed in the generally vertically extending member 94A of frame 70. Each stud 128 is then secured by a nut 132 so as to rigidly mount the end manifold 76 of radiator 72 to frame 70. The step of resiliently mounting the second lateral portion, or end manifold 78 of radiator 72 to frame 70 includes the step of coupling a pair of vertically spaced spring members 134 to the end manifold 78 and the U-shaped portion 88B of frame 70. Radiator assembly 18 includes a pair of vertically spaced, multi-pronged mount brackets 136 having a plurality of prongs, or flanges 138. An upper one of the mount brackets 136 is disposed within the U-shaped portion 88B of frame 70, with each of the three prongs 138 fastened to member 90B via bolts 140 which each engage a threaded boss 142 formed on each of the prongs 138 of bracket 136. Each of the bolts 140 pass through slotted holes 144 formed in the U-shaped portion 88B. The lower one of the mount brackets 136 is similarly attached to the lower member 92B of U-shaped portion 88B of frame 70. Radiator assembly 18 further includes a second vertically spaced pair of the nuts 126 brazed within indentations formed in the end manifold 78 and a pair of studs 146. Each of the studs 146 includes a first end brazed within one of the nuts 126 and a second threaded end. Each of the leaf springs 134 is fastened at a first end thereof to one of the mount brackets 136 via a pair of rivets 148, so as to couple each of the leaf springs 134 to the U-shaped portion 88B of frame 70. Each leaf spring 134 is coupled to end manifold 78 by attaching a second, opposite end of each spring 134 to the end manifold 78 via one of the studs 146 which are secured with nuts 150. The use of slotted holes 144 formed in the U-shaped member 88B permits the position of each of the mount brackets 136 to be adjusted laterally relative to member 88B. This is important as it permits each of the leaf springs 134 to be preloaded laterally.

Referring now to FIGS. 13–16, the apparatus and method for mounting the charge air cooler 16 to the radiator assembly 18 and for mounting the condenser 14 to the charge air cooler 16, is illustrated and discussed in further detail. A pair of laterally spaced, lower mount brackets 152 are attached to the frame 70 of radiator assembly 18, by conventional means such as welding. One of the brackets 152 is attached to the vertical member 94A of the U-shaped portion 88A of frame 70, while the other bracket 152 is attached to the vertical member 94B of the U-shaped portion 88B of frame 70. Each of the brackets 152 includes a generally horizontally extending portion, or flange 154 having a hole 156 formed therein. A pair of downwardly extending and laterally spaced pins 158 are attached to the charge air cooler 16, with the lateral spacing between pins 158 being substantially equal to the spacing between holes 156 of brackets 152. A compressible grommet assembly 160 is positioned in each of the two lower mount bracket holes 156. Each of the grommet assemblies 160 includes a nylon insert 162 having a generally cylindrical portion 164. Grommet assembly 160 further includes a grommet 166 made of an elastomeric material which includes a central hole therein and is disposed coaxially about the cylindrical portion 164 of insert 162. The nylon insert 162 is preferably molded together with grommet 166 so as to form a unitary construction of grommet assembly 160. Each of the pins 158 of the charge air cooler 16 is inserted through one of the grommet assemblies 160 and the corresponding lower mount bracket 154 so that charge air cooler 16 rests on the grommet assemblies 160. A pair of laterally spaced, upper mount brackets 168 is attached to frame 70 of radiator assembly 18 by conventional means, such as welding. A first one of the brackets 168 is attached to the vertical member 94A of the U-shaped portion 88A of frame 70, while the other bracket 168 is attached to the vertical member 94B of the U-shaped portion 88B of frame 70. Each of the brackets 168 includes a laterally facing portion 170 having a generally horizontally extending hole 172 formed therein. A pair of laterally spaced, upper mount flanges 174 are attached to the charge air cooler 16 by conventional means, such as welding. Each of the mount flanges 174 includes a mount hole 176 formed therein, with the hole 176 of each mount flange 174 being aligned with the hole 172 of one of the upper mount brackets 170. A compressible grommet assembly 178 is disposed in each of the upper mount bracket holes 172. Each of the grommet assemblies 178 includes a generally cylindrical metallic sleeve 180 and a grommet 182 made of an elastomeric material. Grommet 182 includes a central hole therein and is disposed coaxially about the metallic sleeve 180. Each grommet assembly 178 further includes a pair of metallic washers 184, each having a hole formed therein, with the washers 184 being disposed on opposite lateral ends of grommet 182. Washers 184 and sleeve 180 are preferably molded together with grommet 182 so as to form a unitary construction of grommet assembly 178. A threaded fastener 186, comprising a conventional bolt, is inserted through each of the upper mount flange holes 176 and the corresponding ones of the grommet assemblies 178 and is secured with a nut 188 so as to apply a clamp load to each of the upper mount flanges 174, the corresponding ones of grommet assemblies 178 and upper mount brackets 168.

Figure 13:
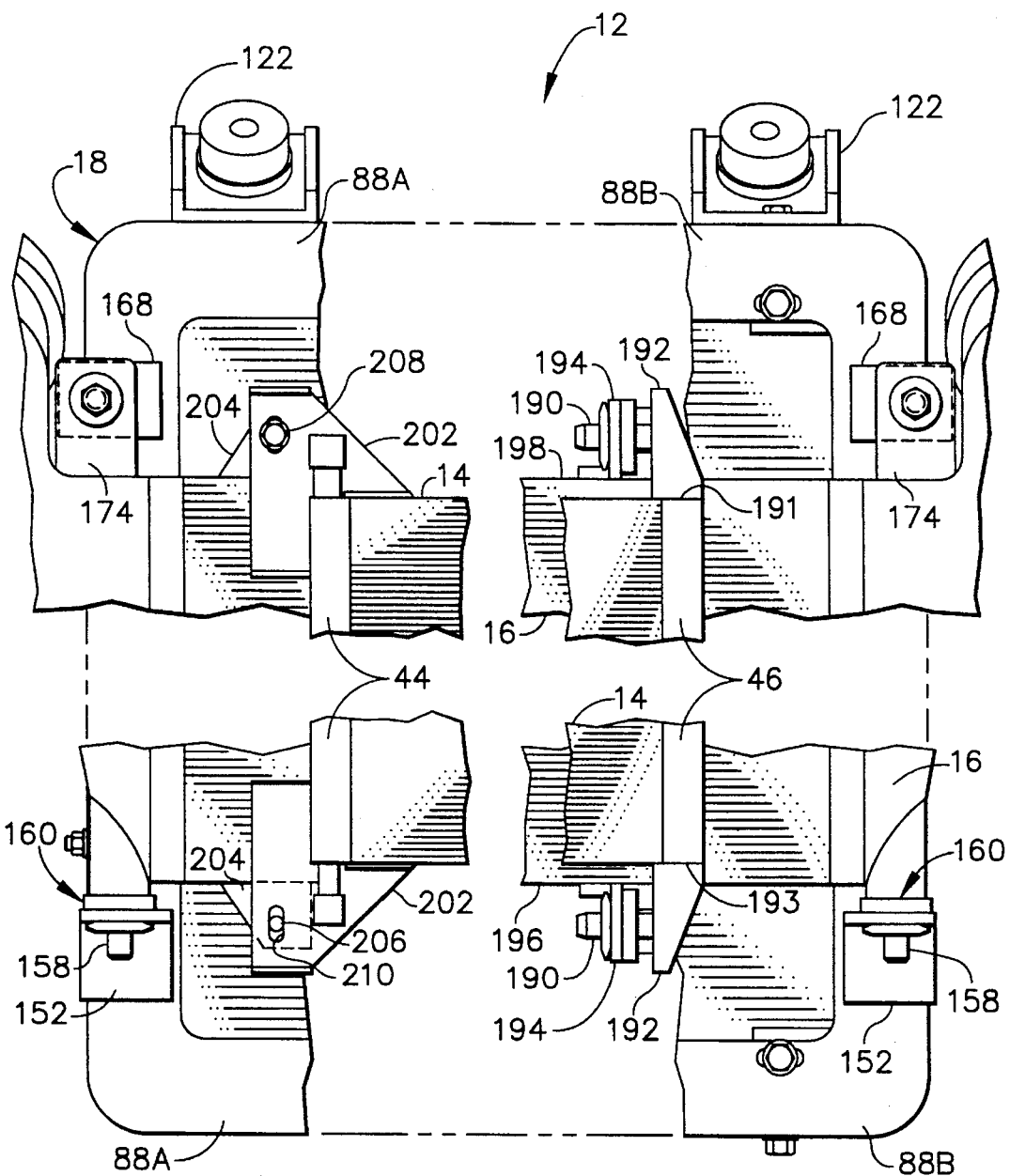
FIG. 13 is a fragmentary front elevational view of the condenser, charge air cooler and radiator assembly of the present invention.
Figure 14:
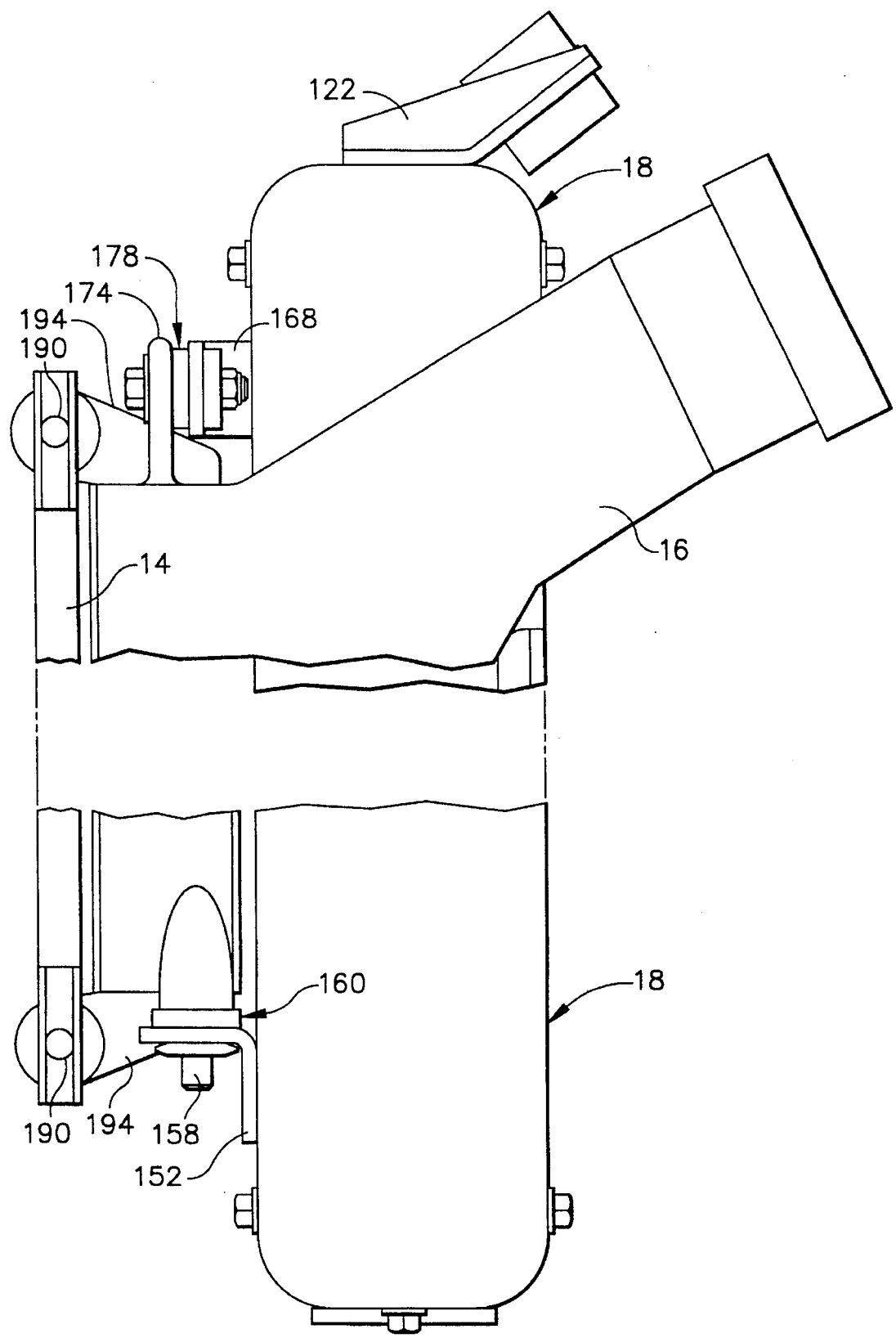
FIG. 14 is a fragmentary side elevational view illustrating the condenser, charge air cooler and radiator assembly of the present invention.
Figure 15:
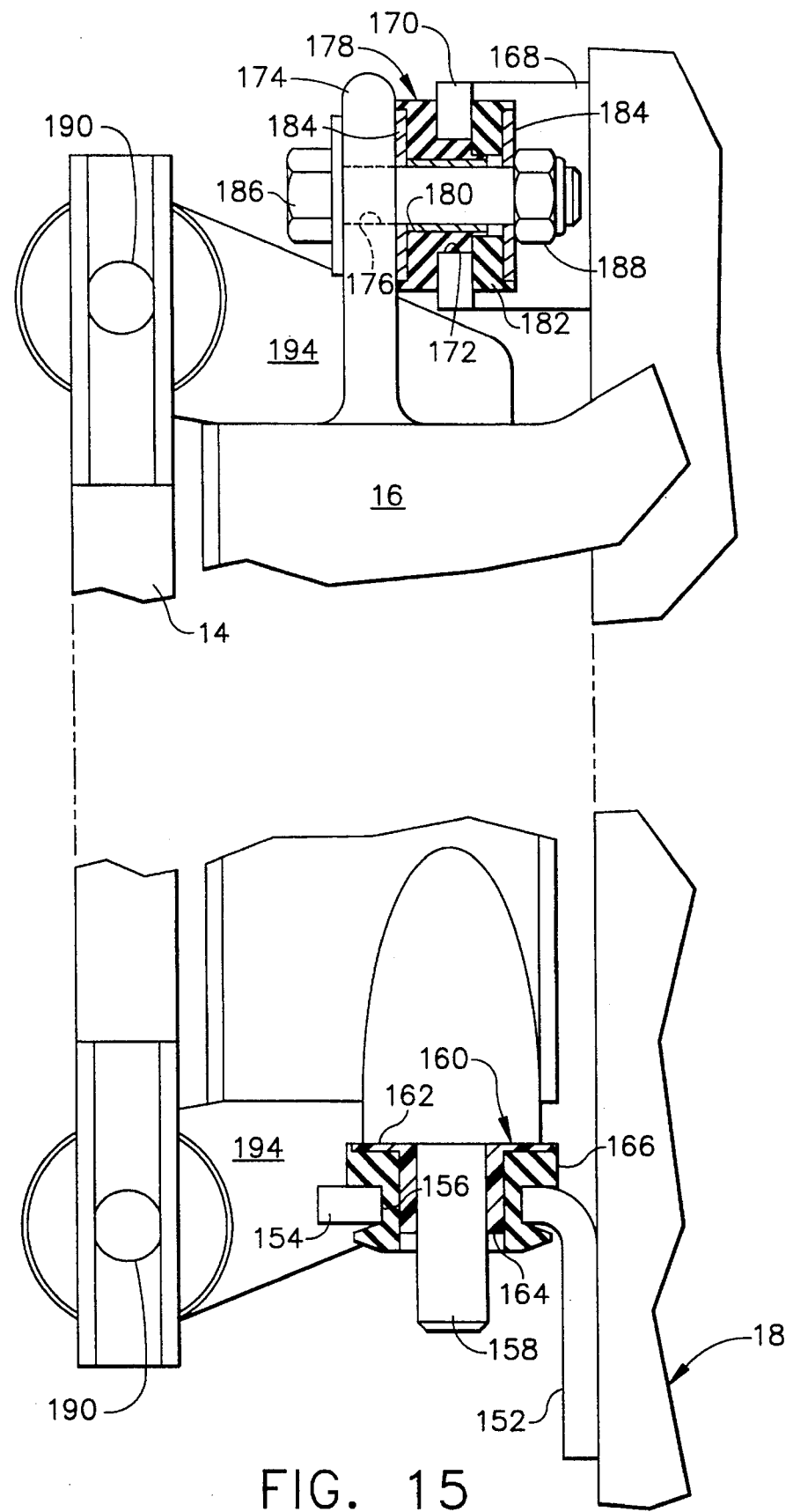
FIG. 15 is an enlarged fragmentary side elevational view, partially in cross-section, further illustrating the method of mounting the condenser to the charge air cooler and the charge air cooler to the radiator assembly.
Figure 16:
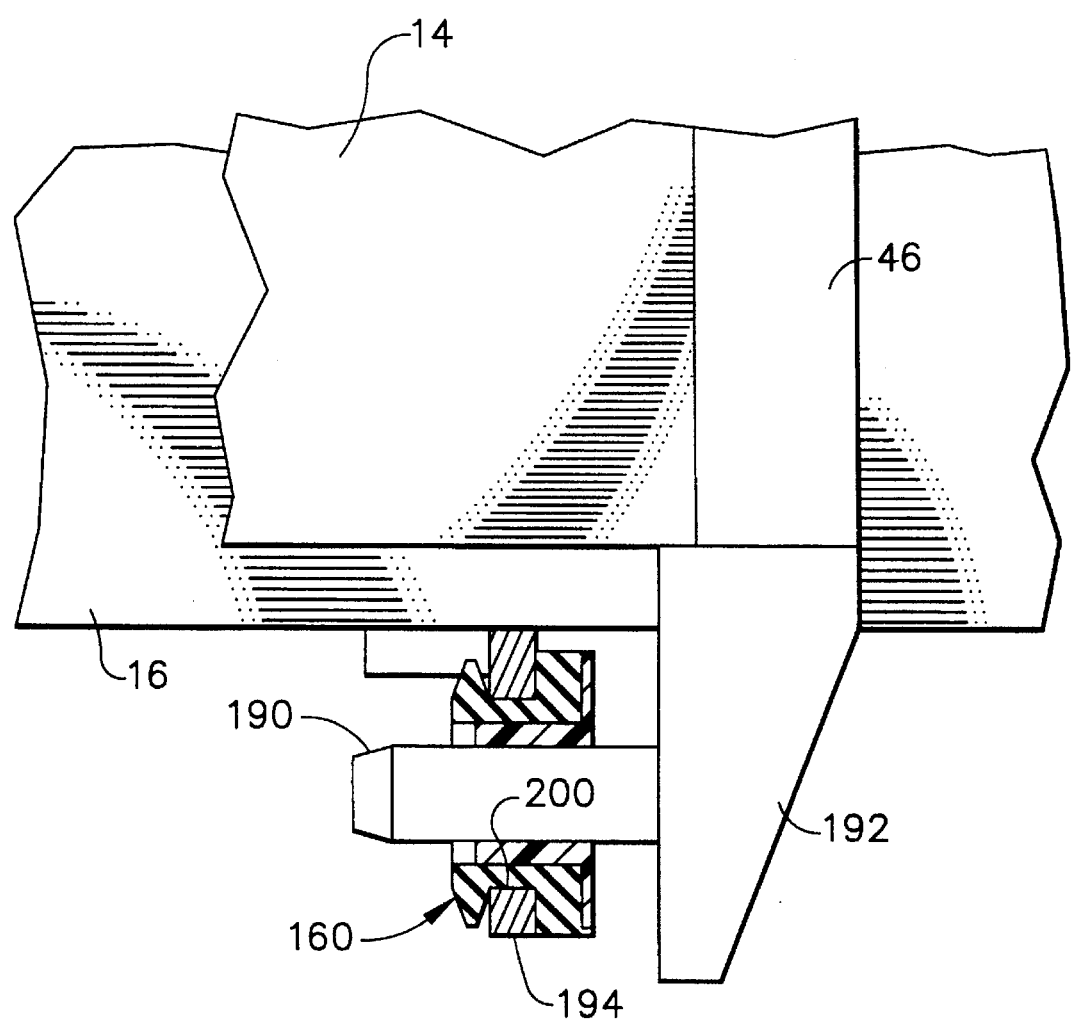
FIG. 16 is an enlarged front elevational view, partially in cross-section, further illustrating the method of mounting the condenser to the charge air cooler.

The mounting of the condenser 14 to the charge air cooler 16 may be further illustrated with reference to FIGS. 13 and 16 and the following discussion. A pair of vertically spaced and generally horizontally extending pins 190 are connected to a first lateral end portion, comprising the end manifold 46, of condenser 14. Pins 190 are connected to the end manifold 46 by attaching a pair of vertically spaced mount brackets 192 to an upper end 191 and a lower end 193 of end manifold 46 by conventional means, such as welding, and attaching one of the pins 190 to each of the brackets 192. A pair of vertically spaced pin-receiving mount means or mount structures 194, which comprise a pair of vertically spaced mount brackets in the embodiment shown in FIGS. 13 and 16, are attached to the charge air cooler 16. One of the brackets 194 is attached to a lower surface 196 of the charge air cooler 16 while the other bracket 194 is attached to an upper surface 198 of the charge air cooler 16. Each of the brackets 194 includes a vertically extending portion with a hole 200 formed therein, with each of the holes 200 being aligned with one of the pins 190. One of the grommet assemblies 160, described previously, is disposed within each of the holes 200 of mount brackets 194. Each of the pins 190 is inserted through one of the grommet assemblies 160, with each of the pins 190 being free to slide laterally within the nylon inserts 162 of the grommet assemblies 160. Accordingly, end manifold 46 of condenser 14 may move laterally relative to charge air cooler 16. A pair of vertically spaced mount brackets 202 are attached to condenser 14, with brackets 202 being laterally spaced from mount brackets 192 as shown in FIG. 13. A pair of mating, vertically spaced mount brackets 204 are attached to the charge air cooler 16, by conventional means such as welding, and are aligned with brackets 202. Brackets 202 and 204 are fastened to one another by bolts 206 and nuts 208. As shown in FIG. 13 (where the lower one of nuts 208 has been removed for purposes of illustration), the lower one of the mount brackets 202 includes a slotted hole 210 which receives one of the bolts 206 and is effective for permitting vertical movement of the condenser 14 relative to the charge air cooler 16. In contrast, brackets 202 and 204 are not free to move laterally relative to one another and accordingly, differential lateral thermal growth between condenser 14 and charge air cooler 16 is accommodated by the sliding engagement of pins 190 within grommet assemblies 160.

Figures 17, 18:
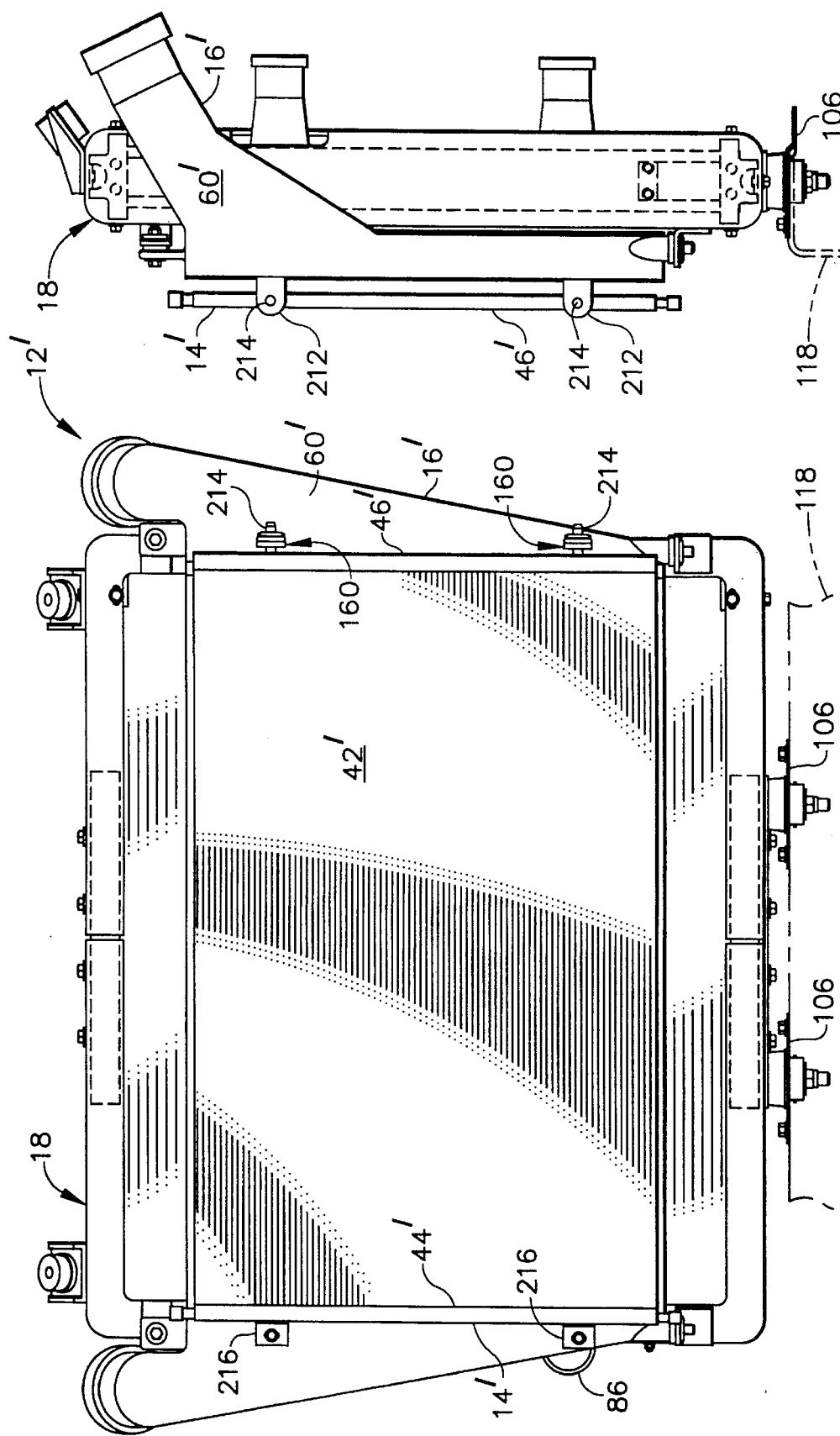
FIG. 17 is a front elevational view illustrating the cooling system of the present invention according to an alternative embodiment.
FIG. 18 is a side elevational view illustrating the alternative cooling system shown in FIG. 17.

FIGS. 17 and 18 illustrate a cooling system 12', according to an alternative embodiment of the present invention. Cooling system 12' includes a condenser 14', a charge air cooler 16' and a radiator assembly 18 which are structurally the same, and are mounted to one another as described previously with respect to condenser 14, charge air cooler 16 and radiator 18 of cooling system 12, with the following exceptions. Charge air cooler 16' includes a pair of vertically spaced pin-receiving mount means 212, which comprise a pair of vertically spaced mount flanges, which replace the mount brackets 194 attached to the charge air cooler 16. Each of the mount flanges 212 is preferably cast an integral unit with an outlet end manifold 60' of charge air cooler 16', for cost reduction purposes. Manifold 60' and flanges 212 are preferably made of cast aluminum. End manifold 60' is otherwise the same as manifold 60 charge air cooler 16. Condenser 14' includes a core 42', having a lateral width which is greater than that of the core 42 of condenser 14. Brackets 202 of cooling system 12, which are attached to condenser 14, are replaced by a pair of mount brackets 216 which are vertically spaced and attached to an end manifold 44' of condenser 14'. Also, brackets 204 of cooling system 12, which mate with brackets 202, are replaced with a pair of vertically spaced mount brackets (not shown) which are attached to charge air cooler 16' and are fastened to brackets 216 so as to laterally fix end manifold 44' of condenser 14' relative to charge air cooler 16'. Additionally, condenser 14 includes a pair of vertically spaced pins 214 which are attached to an end manifold 46' of condenser 14'. One of the grommet assemblies, 160, discussed previously, is inserted through a hole formed in each of the mount flanges 212 of charge air cooler 16'. Each of the pins 214 are then inserted through one of the grommet assemblies 160, with the pins 214 being free to move laterally within the nylon inserts 162 of grommet assemblies 160. The opposite lateral end of condenser 14' is mounted to charge air cooler 16' in the same manner as that discussed previously with respect to condenser 14 and charge air cooler 16.

In operation, condenser 14, charge air cooler 16 and radiator 72 of radiator assembly 18 are effective for cooling the respective fluids flowing therethrough, as a result of the ambient air 22 flowing across the tubes and fins of each component. The resilient mounting of the lateral end portion of radiator 70, corresponding to end manifold 78, permits lateral thermal growth of the radiator 72 relative to the frame 70 of radiator assembly 18. As the temperature of radiator 72 varies relative to that of frame 70, leaf springs 134 deflect laterally so as to accommodate lateral thermal growth of radiator 72 relative to frame 70. The use of the lower elastomeric isolators 110 and the upper elastomeric isolators 124 in the corresponding mount brackets used to attach radiator assembly 18 to the chassis of the corresponding motor vehicle isolates radiator assembly 18 from mechanical vibration loads of the motor vehicle. As the temperature profile of condenser 16 varies relative to that of radiator assembly 18, the upper grommet assemblies 178 may compress or expand laterally, while the lower grommet assemblies 160 may expand or contract radially due to the movement of pins 158 relative to brackets 154. Accordingly, differential thermal growth between charge air cooler 16 and radiator assembly 18 is accommodated. The engagement of pins 190, which are connected to condenser 14, within grommet assemblies 160 permits the end manifold 46 of condenser 14 to move laterally relative to charge air cooler 16, so as to accommodate differential lateral thermal growth between condenser 14 and charge air cooler 16. The foregoing discussion is also illustrative of the operation of cooling system 20'.

While the foregoing description has set forth the preferred embodiments of the invention in particular detail, it must be understood that numerous modifications, substitutions, and changes can be undertaken without departing from the true spirit and scope of the present invention as defined by the ensuing claims. The invention is therefore not limited to specific preferred embodiments as described but is only limited as defined by the following claims.

What is claimed is:

1. A cooling system sub-assembly for use in a motor vehicle, comprising:

a charge air cooler mountable to a support structure attached to a chassis of the motor vehicle;

a condenser mounted to said charge air cooler so as to accommodate at least differential thermal growth between said condenser and said charge air cooler and so as to dispose said condenser in series flow relationship with said charge air cooler, wherein said condenser includes a core and first and second lateral end portions attached to opposite lateral ends of said core;

a pair of vertically spaced generally horizontally extending pins extending substantially in the direction of said differential thermal growth connected to said first lateral end portion of said condenser;

a pair of vertically spaced pin-receiving mount means attached to said charge air cooler, wherein each of said mount means includes a hole formed therein which is aligned with one of said pins;

a pair of compressible grommet assemblies, wherein one of said compressible grommet assemblies is disposed within said hole formed in one of said mount means;

wherein each of said pins is inserted through one of said grommet assemblies.

2. The cooling system sub-assembly as recited in claim 1, further comprising:

a first pair of vertically spaced mount brackets attached to said condenser, wherein said first pair of mount brackets is laterally spaced from said pins; a second pair of vertically spaced mount brackets attached to said charge air cooler, wherein each of said second pair of mount brackets is aligned with and fastened to one of said first pair of mount brackets.

3. The cooling system sub-assembly as recited in claim 2, wherein:

said charge air cooler includes a core and a pair of end manifolds attached to opposite lateral ends of said core;

said pair of vertically spaced pin-receiving mount means comprises a third pair of vertically spaced mount brackets, wherein a first one of said third pair of mount brackets is attached to an upper surface of said core of said charge air cooler and a second one of said third pair of mount brackets is attached to a lower surface of said core of said charge air cooler.

4. The cooling system sub-assembly as recited in claim 3, further comprising:

a fourth pair of vertically spaced mount brackets;

wherein a first one of said fourth pair of mount brackets is attached to an upper end of said first lateral end portion of said condenser;

wherein a second one of said fourth pair of mount brackets is attached to a lower end of said first lateral end portion of said condenser;

wherein each of said pins is attached to one of said fourth pair of mount brackets.

5. The cooling system sub-assembly as recited in claim 1, wherein:

said charge air cooler includes a core and a pair of end manifolds attached to opposite lateral ends of said core;

said pair of vertically spaced pin-receiving mount means comprises first and second vertically spaced mount flanges;

wherein said first and second vertically spaced mount flanges and one of said end manifolds of said charge air cooler are cast as an integral unit.

6. The cooling system sub-assembly as recited in claim 5, wherein:

each of said generally horizontally extending pins is directly attached to said first lateral end portion of said condenser.

7. The cooling system sub-assembly as recited in claim 1, wherein:

each of said pair of compressible grommet assemblies comprises a nylon sleeve having a generally cylindrical portion disposed about one of said pins and an elastomeric grommet coaxially disposed about said generally cylindrical portion:of said nylon sleeve.

* * * * *